A. E. Smith.
Attaching Hubs to Axles.
No. 3,410. Reissued Apr. 27, 1869.
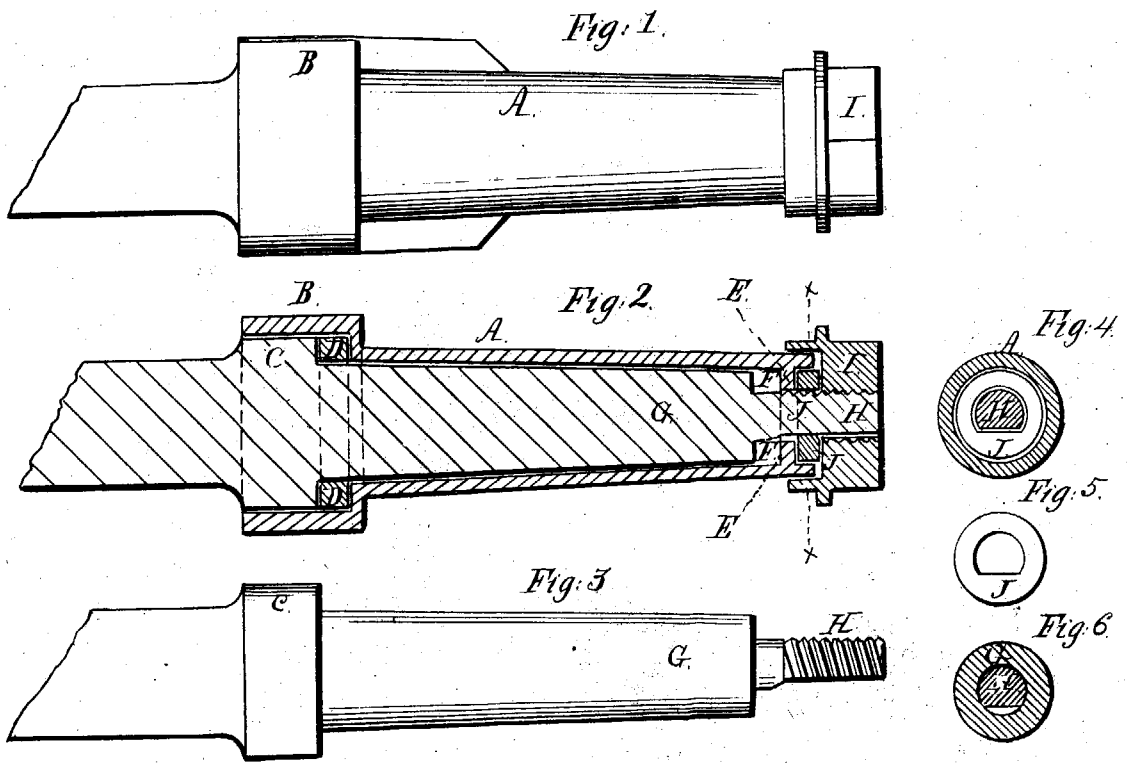
Witnesses:
C. L. Barry
Franklin Barnett
Inventor.
Alfred E. Smith United States Patent Office.

ALFRED E. SMITH, OF BRONXVILLE, NEW YORK.

*Letters Patent No.* 72,555, *dated December* 24, 1867; *reissue No.* 3,410, *dated April* 27, 1869.

IMPROVEMENT IN AXLES FOR CARRIAGES.

The Schedule referred to in these Letters Patent and making part of the same.

*To all whom it may concern:*

Be it known that I, ALFRED E. SMITH, of Bronxville, Westchester county, and State of New York, have invented certain new and useful Improvements in Axles for Wagons and other vehicles; and I do hereby declare that the following is a full description of the same.

The nature of my invention consists in forming the screw-tap with a flattened or grooved face, and combining therewith a D-shaped washer, so as to be held from being carried around with the hub, and thus form a bearing for the screw-cap or nut to act against, in drawing the hub on it, instead of acting directly against the end of the metal box, as is commonly the case, and thereby preventing the cap or nut from getting loose when the wagon is backing, or getting "set up," when it is going forward, as is the case where the cap or nut draws up against the end of the hub or axle-box secured therein.

But to describe my invention more particularly, I will refer to the accompanying drawings, forming a part of this specification, the same letters of reference, wherever they occur, referring to like parts.

Figure 1 is a side view of the axle and metal box.

Figure 2 is a longitudinal cut section of the same.

Figure 3 is a detached view of the axle or spindle.

Figure 4 is a transverse cut section of the spindle, through the line *x x*, fig. 2.

Figure 5 is a detached view of the metal washer.

Figure 6 is an end view of the spindle.

Letter A is a metal box, having, at its back end, an enlarged chamber, B, for the support of the shoulder C of the axle, and a packing, D, for preventing the parts from grinding away or cutting out.

Letter E is an annular collar, or diaphragm in the front end of the metal box.

The object of this is to form a wall, and thus make a receptacle, F, behind it and in front of a shoulder on the end of the spindle G, for an oil-chamber.

This spindle is made of less length in its bearing-surface, than the length of the metal box in which it runs, and has an elongated screw-tap, H, extending through or beyond the end of the box, to engage in the screw-tap or nut I, for holding the wheel on the axle.

Between the screw-cap or nut and the end of the box, and on the screw-tap is a metal washer-plate, J, having its inner circumference formed somewhat like a D, (though any other angular shape will answer as well,) to correspond with the flattened or notched side or sides, as the case may be, of the screw-tap, so as to prevent the same from turning on the screw-tap.

The object of this is to prevent the washer from rotating, and thus, when the screw-nut is turned up, the hub is forced up the spindle, to compensate for the shrinkage or wearing away of the leather washers, in the back end of the box, and as the screw-nut draws against the washer J instead of against the end of the metal box or hub, it will be apparent that whether the wheel rotates backward or forward, it can have no effect upon the screw-nut to unloose or tighten it up, as is the case where the screw-nut draws up on the screw-tap directly against the end of the metal box or hub of the wheel.

It will be obvious that the metal washer J may be seated in a cavity formed in the screw-cap, and act against the end of the metal box in the hub instead of being placed within the end of the box against the diaphragm E. In either case the effect is the same.

It will be obvious also, that one or more washers J may be used, and leather and metal used together, and therefore do not restrict myself to the use of a single metal washer, or mode of applyin the same, but purpose to use one or more, and leather and metal together, as circumstances may require, to accomplish the result aimed at, to wit, making an anti-nut-loosening compensating axle for wagons and other vehicles.

Having now described my invention, I will proceed to set forth what I claim, and desire to secure by Letters Patent of the United States.

I claim the D-shaped washer J, in combination with the screw-tap H, and diaphragm E, whether formed at the end of the box A, or within the edge thereof, and operating substantially as hereinbefore set forth.

ALFRED E. SMITH.

Witnesses:

CHARLES L. BARRITT,
FRANKLIN BARRITT.